(12) United States Patent
Nicola

(10) Patent No.: US 9,845,151 B2
(45) Date of Patent: Dec. 19, 2017

(54) TWIN-FUSELAGE ROTORCRAFT

(71) Applicant: AIRBUS HELICOPTERS, Marignane (FR)

(72) Inventor: Jean Nicola, Aix En Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 630 days.

(21) Appl. No.: 14/180,735

(22) Filed: Feb. 14, 2014

(65) Prior Publication Data

US 2014/0239116 A1 Aug. 28, 2014

(30) Foreign Application Priority Data

Feb. 22, 2013 (FR) ..................... 13 00411

(51) Int. Cl.

| B64C 27/26 | (2006.01) |
|---|---|
| B64D 47/08 | (2006.01) |
| B64C 1/00 | (2006.01) |
| B64C 25/04 | (2006.01) |
| B64C 39/04 | (2006.01) |
| B64D 1/22 | (2006.01) |
| B64C 25/32 | (2006.01) |

(52) U.S. Cl.
CPC ............... *B64C 27/26* (2013.01); *B64C 1/00* (2013.01); *B64C 25/04* (2013.01); *B64C 39/04* (2013.01); *B64D 1/22* (2013.01); *B64D 47/08* (2013.01); *B64C 2025/325* (2013.01)

(58) Field of Classification Search
CPC ..................................................... B63C 27/26
USPC ..................................................... 244/6, 7 A
See application file for complete search history.

(56) References Cited

U.S. PATENT DOCUMENTS

| 1,417,884 A | * | 5/1922 | Bernier | ................. B64C 23/005 |
|---|---|---|---|---|
| | | | | 244/6 |
| 1,885,392 A | * | 11/1932 | Tuten | .................... B64C 35/008 |
| | | | | 244/101 |
| 2,023,334 A | * | 12/1935 | Marmonier | ......... B64C 29/0033 |
| | | | | 114/144 R |

(Continued)

FOREIGN PATENT DOCUMENTS

| EP | 1167183 A2 | 1/2002 |
|---|---|---|
| EP | 2261119 A1 | 12/2010 |

(Continued)

OTHER PUBLICATIONS

French Search Report; French patent application No. 1300411, dated Sep. 2, 2013.

(Continued)

*Primary Examiner* — Brian M O'Hara
*Assistant Examiner* — Keith L Dixon
(74) *Attorney, Agent, or Firm* — Brooks Kushman P.C.

(57) ABSTRACT

A rotorcraft (1) having: a lift rotor (5); a wing (10) extending from a first end (11) carrying a first propulsive propeller (21) to a second end (12) carrying a second propeller (22); landing gear (30); and a tail (40). The rotorcraft (1) is provided with two fuselages (51, 52) secured to said wing (10) between said first and second propulsive propellers (21, 22) in such a manner as to present an inter-fuselage space (60) having no propeller between said fuselages (51, 52), each fuselage (51, 52) including at least one undercarriage of said landing gear (30).

4 Claims, 4 Drawing Sheets

(56) References Cited

U.S. PATENT DOCUMENTS

| | | | | |
|---|---|---|---|---|
| 3,244,246 | A | * | 4/1966 | Weiland .................. B60V 1/22 180/116 |
| D232,711 | S | * | 9/1974 | Kirchner ......................... 244/13 |
| 6,592,073 | B1 | * | 7/2003 | Meekins ............... B64C 11/001 244/105 |
| 7,147,182 | B1 | * | 12/2006 | Flanigan ............. B64C 29/0033 244/6 |
| D612,317 | S | * | 3/2010 | Stinemetze .................. D12/319 |
| 7,967,246 | B2 | * | 6/2011 | Chan ........................ B60V 1/08 244/100 A |
| 8,376,266 | B2 | | 2/2013 | Gemmati et al. |
| 8,702,031 | B2 | * | 4/2014 | Morris ................ B64C 29/0033 244/12.4 |
| 2006/0016931 | A1 | * | 1/2006 | Malvestuto ............. B64C 3/385 244/45 R |

FOREIGN PATENT DOCUMENTS

| | | | |
|---|---|---|---|
| FR | 1330233 | A | 5/1963 |
| GB | 2434785 | | 8/2007 |
| GB | 2454531 | A | 5/2009 |

OTHER PUBLICATIONS

Dr. William Mason; "NASA Tiltrotor Design Report"; V.R.A.F.T.; Virginia Polytechnic Institute and State University; May 2010.

\* cited by examiner

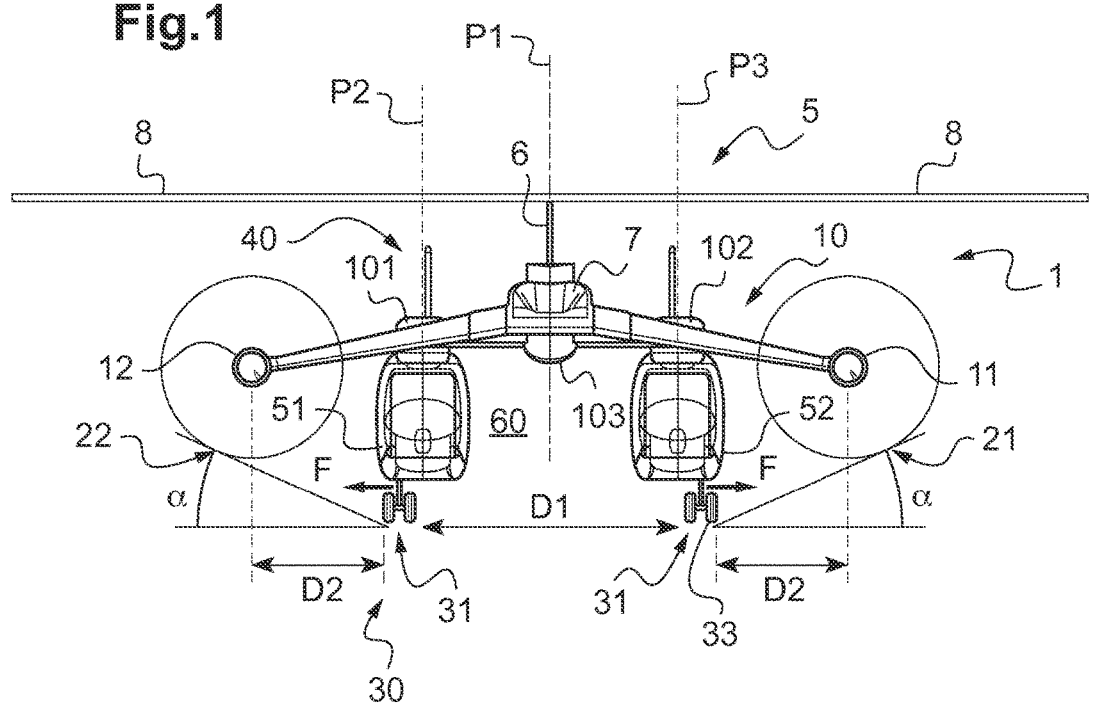
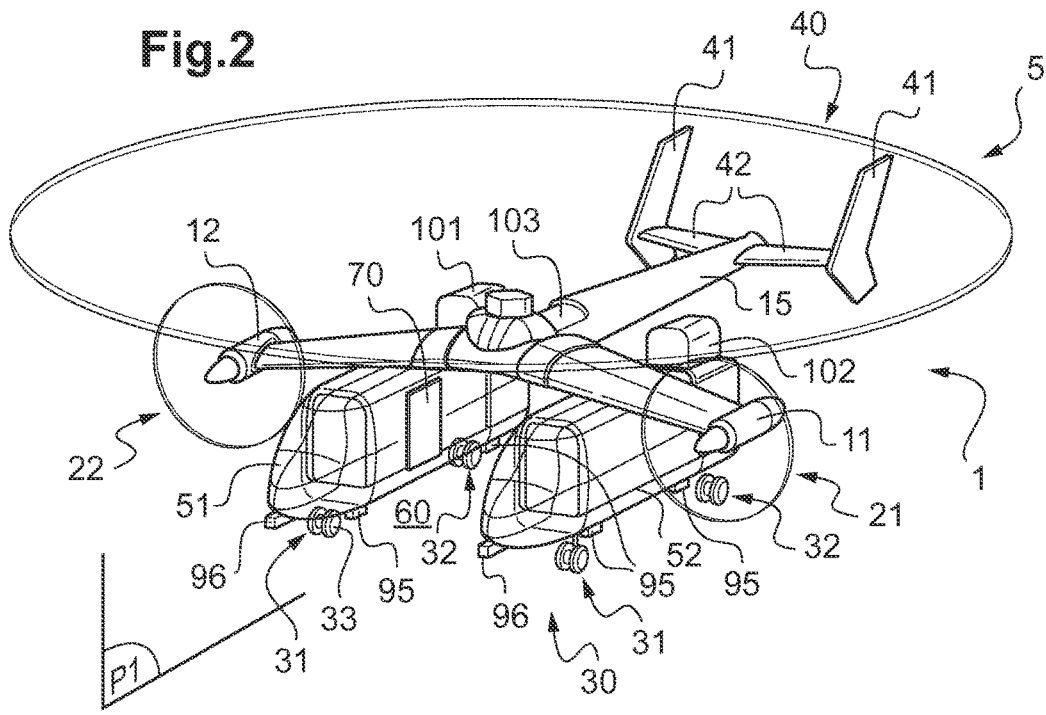

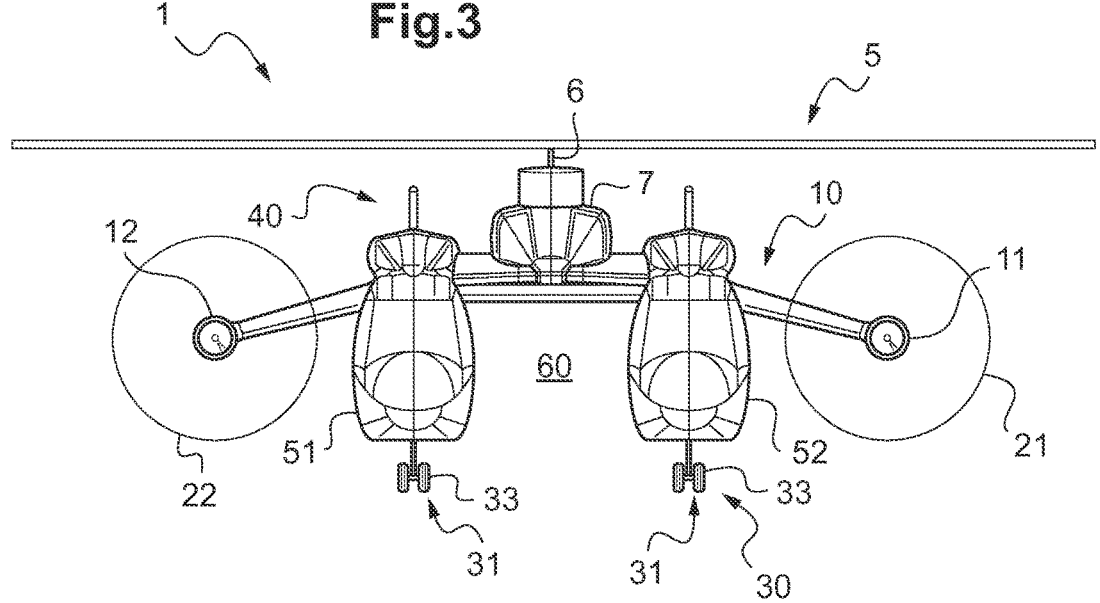
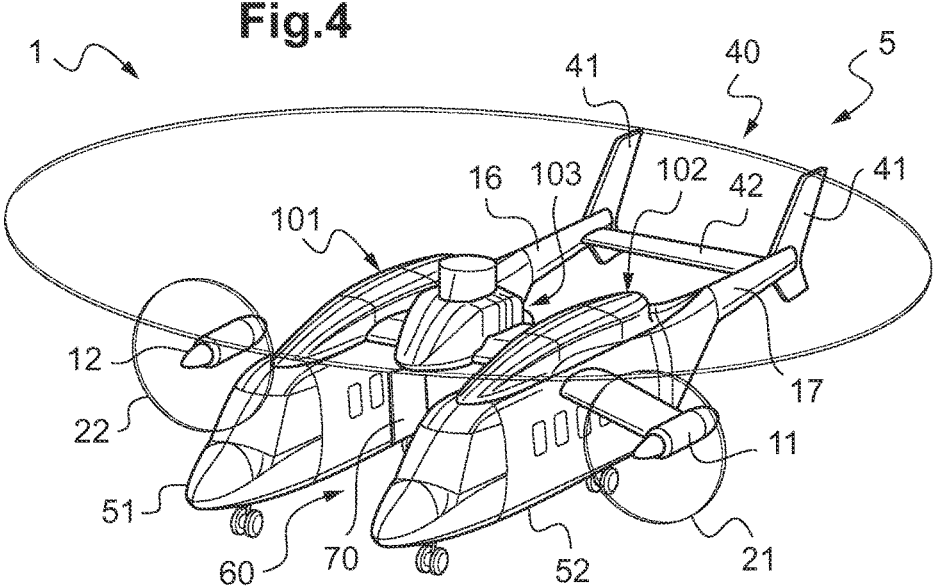

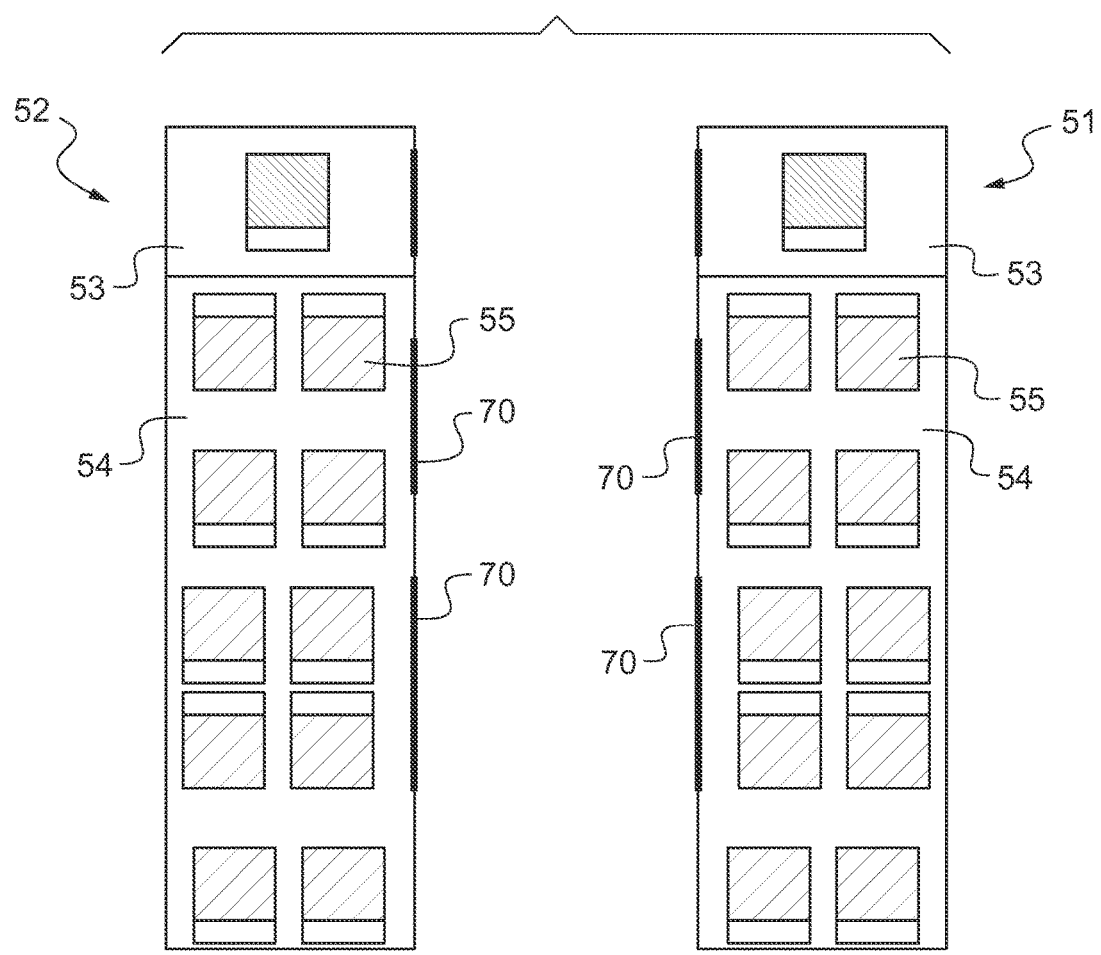

TWIN-FUSELAGE ROTORCRAFT

CROSS REFERENCE TO RELATED APPLICATION

This application claims priority to French patent application No. FR 13 00411 filed on Feb. 22, 2013, the disclosure of which is incorporated in its entirety by reference herein.

BACKGROUND OF THE INVENTION

(1) Field of the Invention

The present invention relates to a rotorcraft having two fuselages.

The invention thus lies in the technical field of rotorcraft, and in particular rotorcraft having high forward speed and including at least one lift rotor and at least one propulsive propeller.

(2) Description of Related Art

Conventionally, a rotorcraft has a rotary wing carried by a fuselage. The rotary wing provides at least some of the lift of the aircraft, and possibly also at least some of its propulsion. Such a rotary wing is then provided with at least one rotor that is referred to for convenience as the "lift" rotor.

Rotorcrafts are also known that have a rotary wing and a wing carrying at least one propulsive propeller arranged on the side of a fuselage. By way of example, two propulsive propellers may be arranged on either side of the fuselage. For this purpose, each propulsive propeller is carried by a half-wing extending from the fuselage of the aircraft.

The propulsive propellers may contribute to propelling the aircraft. In addition, these propellers can generate torque on the fuselage in order to control the aircraft in yaw.

Such a rotorcraft is thus referred to for convenience as an aircraft that is "hybrid" insofar as a rotary wing is associated with at least one propulsive propeller with at least one wing.

Such hybrid aircraft are particularly advantageous. The propellers serve in particular to achieve high forward speeds, and to cover long distances.

Nevertheless, making a hybrid aircraft of large weight, e.g. of the order of 10 (metric) tonnes (t) or more, can raise difficulties.

Since the weight of the aircraft is high, the rotary wing is dimensioned to provide appropriate lift. Compared with a medium weight hybrid aircraft, the rotary wing thus exerts a large amount of force in yaw on the fuselage of a heavy hybrid aircraft.

In order to compensate for this increase in torque compared with a medium weight hybrid aircraft, the manufacturer moves the propellers further away from the fuselage.

Nevertheless, the blades of a rotary wing tend to flex while they are in use, in particular during stages of takeoff and landing. This flexing increases with increasing distance from the axis of rotation of the rotary wing.

Consequently, by moving the propellers further away from the fuselage of a hybrid aircraft, the distance between a propeller and a blade of the rotary wing is reduced. Such a distance is referred to as "rotor clearance" by analogy with "ground clearance" that represents the distance between a member of the aircraft and the ground when the aircraft is standing on the ground.

The manufacturer then tends to move each propeller further away from the fuselage, while also moving it closer to the ground in order to maintain acceptable "rotor clearance".

In order to obtain a hybrid aircraft that is heavy compared with a hybrid helicopter of medium weight, a manufacturer needs to increase the general lift of the rotary wing, and to move the propulsive propellers away from the fuselage while also moving them closer to the ground.

Nevertheless, by moving the propellers closer to ground, the angle of inclination of a straight line passing via a low point of a propeller and a point of contact between the landing gear and the ground is made smaller. In other words, the roll angle that is acceptable for the aircraft on the ground is made smaller.

Consequently, in order to maintain a roll angle that is acceptable, the manufacturer modifies the height of the fuselage in order to increase the ground clearance of the propellers. This serves to increase said roll angle.

The manufacturer can also arrange outriggers close to the propellers in order to avoid contact between a propeller and the ground.

An outrigger is an undercarriage placed under a propeller in an aircraft of medium weight. Outrigger technology can give rise to difficulties on aircraft that are very heavy, e.g. requiring the propeller-carrying wing to be reinforced.

In order to compensate for a loss of stability created by such increased height, it is also possible optionally to increase the width of the fuselage substantially.

A manufacturer can thus obtain a hybrid aircraft that is heavy.

Nevertheless, such a hybrid aircraft presents a fuselage of large frontal surface area. For convenience, the term "frontal surface area" is used to designate the area of the fuselage in contact with air during forward flight. The drag of the heavy hybrid aircraft then runs the risk of degrading its performance.

In this context, the invention lies in the narrow technical field of rotorcraft having a rotary wing and two propulsive propellers, and it seeks to avoid such degradation.

The technological background remote from the technical field includes U.S. Pat. No. 1,885,392, which describes an airplane having two fuselages and one wing.

Likewise, airplanes known under the names "Messerschmitt Me 109Z" and "P82 twin mustang" likewise have two fuselages and one wing.

Document FR 1 330 233 describes a crane helicopter having one fuselage that receives a cockpit and another fuselage that receives on-board equipment.

Those documents do not appear to provide any teaching seeking to solve the target technical problem associated with the increase in drag caused by increasing the weight of a hybrid aircraft.

The technological background also includes a convertible aircraft concept from NASA known under the acronym VTRAFT. That aircraft is provided with two tilt rotors arranged on either side of two fuselages.

That concept thus comes from the remote technical field of convertible aircraft having at least two tilt rotors.

According to the document "NASA tilt rotor design report", available on the internet at the address:
http://www.dept.aoe.vt.edu/~mason/Mason_f/VTRAFT_final_report.pdf
that aircraft has two fuselages for improving the stability of an amphibious convertible aircraft on water. The aircraft can thus land on open water in order to take water on board for the purpose of combating fire.

Also known are documents EP 2 261 119, GB 2 454 531, U.S. Pat. No. 1,417,884, U.S. D 612,317, GB 2 434 785, and EP 1 167 183.

BRIEF SUMMARY OF THE INVENTION

An object of the present invention is thus to propose a rotorcraft provided with a rotary wing and two propulsive propellers suitable for presenting heavy weight and an optimized frontal surface area.

According to the invention, a rotorcraft is provided with a lift rotor, the rotorcraft having a fixed wing extending from a first end carrying a first propulsive propeller to a second end carrying a second propeller, the rotorcraft having landing gear and a tail Such a rotorcraft is thus remote from the VTRAFT concept, which is situated in the remote technical field of convertible aircraft, and not the field of rotorcraft provided with a lift rotor. Indeed, the VTRAFT concept is not concerned with the problem associated with maintaining rotor clearance that is acceptable, since it does not have a lift rotor.

The present rotorcraft is remarkable in particular in that it is provided with two fuselages secured to said wing between said first and second propulsive propellers in such a manner as to present an inter-fuselage space having no propeller between said fuselages, each fuselage including at least one undercarriage of the landing gear.

In addition, the wing may be a wing that is continuous or discontinuous. For example, a discontinuous wing comprises one half-wing carrying the first propeller and extending transversely from one of the fuselages, and another half-wing carrying the second propeller and extending transversely from the other fuselage, together with a central wing extending between the fuselages.

Furthermore, the tail may comprise a plurality of lift surfaces and/or control surfaces, such as at least one horizontal and/or vertical and/or oblique stabilizer.

This rotorcraft thus makes it possible to minimize the frontal surface area of a heavy hybrid helicopter.

In addition, instead of using a single fuselage, this rotorcraft has two fuselages that are spaced apart transversely by a space referred to for convenience as the "inter-fuselage" space.

Each fuselage is offset laterally from the anteroposterior plane of symmetry of the aircraft towards a respective propulsive propeller in order to provide the inter-fuselage space.

Providing an inter-fuselage space thus causes each fuselage to be moved away from the anteroposterior plane of symmetry of the aircraft. Consequently, each undercarriage carried by a fuselage is moved closer to a respective one of the propulsive propellers. This characteristic enables the aircraft to land on ground presenting a lateral slope that is greater than that possible for a conventional aircraft.

Under such circumstances, this construction gives the aircraft a large roll angle without making it necessary to use a fuselage having a large frontal surface area.

In addition, each fuselage carries at least one undercarriage. The inter-fuselage space thus gives rise to maximized spacing between the undercarriages of one fuselage and the undercarriages of the other fuselage. Compared with an aircraft having only one fuselage carried by undercarriages, the invention thus tends to provide advantageous lateral stability. This characteristic thus tends to reduce the risk of rollover in the presence of a strong wind, whether on the ground or on the deck of a ship.

Consequently, the aircraft may be heavy, with two elongate fuselages, each presenting a frontal surface area that tends to be minimized.

The rotorcraft thus provides a novel solution to the technical problem raised of obtaining a heavy rotorcraft using a rotorcraft having a lift rotor and two propulsive propellers.

By construction, the propulsive propellers are also arranged on either side of the assembly comprising the two fuselages. As a result, no propulsive propeller is arranged in the inter-fuselage space. The aircraft thus presents a safe zone between its two fuselages.

This rotorcraft may also include one or more of the following additional characteristics.

Optionally, each fuselage may include at least one door opening out into the inter-fuselage space. For example, a first fuselage has a first side door facing a second side door of the second fuselage.

Passengers can thus embark on board the rotorcraft from the side of each fuselage through doors that open out into the inter-fuselage space. As a result, the passengers move in the inter-fuselage space in order to reach their seats, and therefore they move in a zone that does not include any propulsive propellers. This improves their safety, even if the propulsive propellers are rotating.

Furthermore, the lift rotor may be secured to the wing over the inter-fuselage space.

The rotorcraft may then have a rotor mast for driving the lift rotor in rotation, the mast being arranged on the wing in a midplane of symmetry of the wing over the inter-fuselage space. More particularly, the lift rotor is present in the anteroposterior plane of symmetry of the aircraft with the rotor mast for driving the lift rotor in rotation being contained in this anteroposterior plane.

This improves the equilibrium of the rotorcraft.

Furthermore, each fuselage may be provided with a front undercarriage and a rear undercarriage, each comprising at least one wheel, such as retractable wheeled undercarriages. The landing gear is then provided with four undercarriages, thereby optimizing the stability of the rotorcraft on the ground.

Furthermore, at least one fuselage may carry a winching system arranged in the inter-fuselage space.

This location makes it possible to avoid interference between the winching system and a propulsive propeller in flight. The winching operation is then made safe relative to the propulsive propellers.

It is also possible for two winching systems to be used on a single rotorcraft, e.g. in alternation.

Each winching system is optionally arranged under the wing. The winch operator and the winching system are then not subjected directly to the downdraft of air coming from the lift rotor. This makes the winching operation easier.

Furthermore, the rotorcraft may include a hoist system present in the inter-fuselage space, the hoist system being fastened to the wing under a rotor mast for driving the lift rotor in rotation. The hoist system may comprise at least one stationary or movable hook attached of the wing.

The inter-fuselage space created between the two fuselages thus enables a hoist system to be incorporated for the purpose of hoisting heavy loads. The arrangement of the rotor mast above this hoist system tends to minimize forces, and thus potentially tends to achieve a saving of weight when incorporating this function in the rotorcraft.

In a first embodiment, the rotorcraft has a single tail beam secured to the wing in order to carry the tail.

In a second embodiment, each fuselage has a respective tail beam for carrying the tail.

Furthermore, each fuselage may carry at least one buoyancy device. The inter-fuselage space causes the buoyancy devices of the rotorcraft to be spaced further apart, thereby tending to improve the stability of the aircraft on a liquid surface.

In another aspect, each fuselage may carry an engine for driving rotation of the lift rotor together with the first and second propulsive propellers via a drive train for transmitting motion.

In addition, or as an alternative, the wing may carry at least one engine for driving rotation of the lift rotor and of the first and second propulsive propellers via a drive train for transmitting motion.

For example, the wing carries all of the engines for driving the lift rotor and the propellers.

Furthermore, each fuselage may include a cockpit for a crew member and a cabin having two rows of seats without an aisle.

Having a pilot in each cockpit makes it possible to comply with requirements concerning visibility for pilots.

In addition, regulations require a crew member to be present and capable of moving about in a cabin as from some threshold number of passengers.

By using two fuselages, each fuselage may optionally receive half the number of passengers that would be received by an aircraft having only one fuselage. Under such circumstances, it is possible to envisage avoiding having a crew member present in each of the fuselages.

In addition, each fuselage may include a cockpit for a crew member and a cabin comprising a plurality of rows of seats without an aisle, the rotorcraft having a door opening out to said inter-fuselage space to give access to at least two rows of seats.

Under such circumstances, each fuselage may be of limited height. Since all of the seats are directly accessible from a door, and since there is no aisle, it is possible to avoid leaving room inside a fuselage suitable for receiving a person standing.

This reduces the drag of the rotorcraft.

In addition, each fuselage may include a thermal camera for use by the pilot. The aircraft may thus have one pilot in each fuselage, with each pilot having a thermal camera available for use.

Other types of equipment may also be used, such as search lights, forward-looking infrared or electro-optical systems, known under the acronyms FLIR or EOS, optical detectors, . . . . Such equipment may be placed under the two cockpits in order to avoid being mounted on the side of the aircraft, thereby saving weight and optimizing drag.

The presence of two cockpits also makes it possible to install two pieces of equipment under the noses of the fuselages without degrading performance, where performance may be degraded in particular by a fuselage masking visibility.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIGS. 1 and 2 show a first embodiment;
FIGS. 3 and 4 show a second embodiment;
FIG. 8 is a diagram showing cabins in the fuselages of a rotorcraft of the invention.

Figure 5:
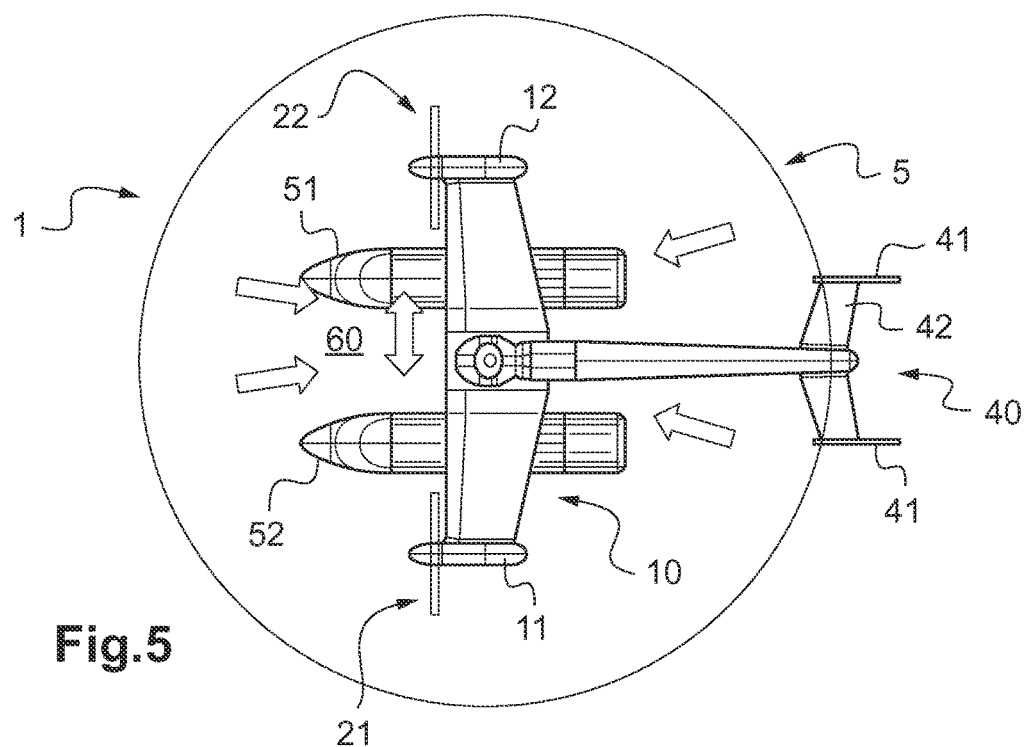
FIG. 5 is a diagram for explaining a procedure for embarking passengers.

Elements present in more than one of the figures are given the same references in each of them.

DETAILED DESCRIPTION OF THE INVENTION

FIGS. 1 and 2 show a first embodiment of a rotorcraft 1, and FIGS. 3 and 4 show a second embodiment of a rotorcraft 1.

With reference to FIG. 1, and independently of the embodiment, the rotorcraft 1 has a lift rotor 5 comprising a plurality of blades 8. This lift rotor may possibly contribute to propelling the rotorcraft 1.

The rotorcraft 1 also has a fixed wing including a wing 10 extending spanwise from a first end 11 towards a second end 12, and passing through an anteroposterior plane of symmetry P1 of the rotorcraft. The wing may be continuous, or it may be discontinuous, presenting a plurality of segments.

The lift rotor 5 is then carried by the wing 10. For example, the wing 10 carries a main gearbox 7 for driving a rotor mast 6. The rotor mast 6 then drives the lift rotor 5 in rotation about an axis of rotation.

Furthermore, the rotor 1 has a first propulsive propeller 21 and a second propulsive propeller 22. The first propulsive propeller 21 is arranged at the first end 11 of the wing 10, with the second propulsive propeller 22 being arranged at the second end 12 of the wing 10.

It should be observed that the term "end of the wing" is used to cover an end zone of a wing. The wing may thus include lift surfaces on both sides of a propeller in a variant that is not shown, or it may include a lift surface on one side only of a propeller as in the variant shown, in which each propeller is arranged at the tip of a wing.

Furthermore, the rotorcraft 1 has two fuselages 51, 52 that are secured to the wing 10 between the first propulsive propeller 21 and the second propulsive propeller 22. The first fuselage 51 and the second fuselage 52 are spaced apart from each other by an inter-fuselage space 60. Consequently, the first fuselage 51 is arranged between the anteroposterior plane P1 and the first propulsive propeller 21, while the second fuselage 52 is arranged between the anteroposterior plane P1 and the second propulsive propeller 22.

The lift rotor 5 is then secured to the wing 10 over the inter-fuselage space 60. Likewise, the rotor mast 6 for driving the lift rotor 5 in rotation is arranged in the anteroposterior plane of symmetry P1 of the wing 10 over the inter-fuselage space 60.

The inter-fuselage space thus does not contain a rotary element, and in particular it does not receive a propulsive propeller.

With reference to FIGS. 2 and 4, each fuselage 51, 52 has at least one door 70 facing the inter-fuselage space 60.

In addition, each fuselage 51, 52 is fitted with at least one undercarriage of landing gear 30. For example, each fuselage 51, 52 has a front undercarriage 31 and a rear undercarriage 32, each comprising at least one wheel 33.

The undercarriages are advantageously, but not necessarily, retractable into a respective compartment in the associated fuselage.

With reference to FIG. 5, passengers can then embark in the aircraft by passing through the inter-fuselage space 60 along the arrows shown.

With reference to FIG. 1, the inter-fuselage space 60 extends transversely away from an undercarriage of the first fuselage 51, referred to for convenience as the "left" undercarriage, to an undercarriage of the second fuselage 52, referred to for convenience as the "right" undercarriage, with "left" and "right" being relative to the sheets of the figures. The first transverse distance D1 is then maximized so as to optimize the stability of the aircraft, in particular in roll.

Conversely, the second transverse distance D2 between the undercarriages of a fuselage and the adjacent propulsive propeller is minimized. This serves to optimize the amount of ground slope that is acceptable during landing.

The angle of inclination a of a straight line passing via a low point of a propeller and a point of contact of the landing gear with the ground is maximized without increasing the height of the fuselages.

For this purpose, each undercarriage may be offset along arrows F relative to the plane of symmetry P2, P3 of the associated fuselage in order to be located closer to a propeller.

Furthermore, and with reference to FIGS. 2 and 4, the rotorcraft 1 includes a power plant for driving rotation of the lift rotor 5, of the first propulsive propeller 21, and of the second propulsive propeller 22.

This power plant may then comprise at least one "lateral" engine 101, 102 carried by each fuselage, and/or at least one "central" engine 103 carried by the wing 10. The engines are connected together by a drive train for transmitting power to the lift rotor and to the propulsive propellers.

In addition, the rotorcraft 1 has a tail 40. The tail may have vertical fins 41 for controlling the rotorcraft in yaw, and/or horizontal stabilizers 42 for controlling the rotorcraft in pitching. For example, two vertical fins are connected together by a horizontal stabilizer.

On either side of the anteroposterior plane of symmetry P1, each fin may comprise fixed surfaces, or it may also include movable control surfaces such as flaps.

In the first embodiment of FIG. 2, the rotorcraft 1 has a single tail beam 15 secured to the wing 10 in order to carry the tail 40. The single tail beam 15 may connect the wing 10 to a horizontal stabilizer 42.

In the second embodiment of FIG. 4, the rotorcraft has two tail beams. Thus, each fuselage 51, 52 has a tail beam 16, 17 for carrying the tail 40.

Figure 6:
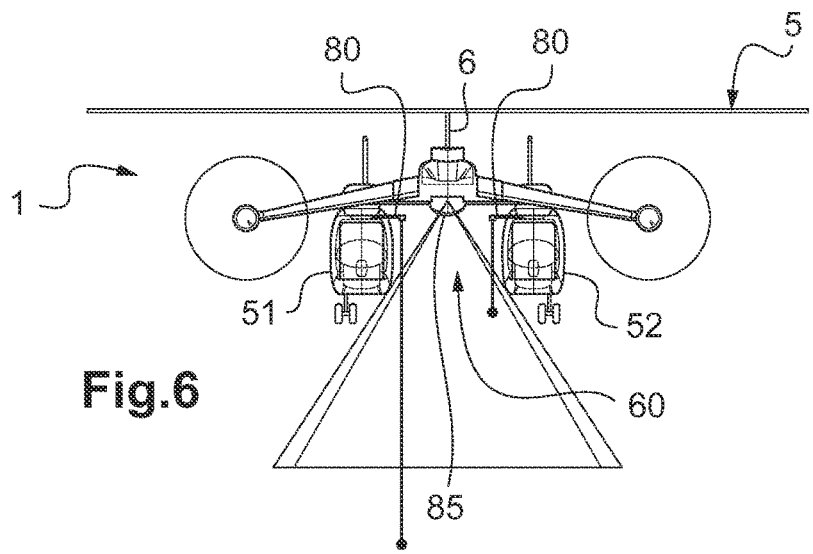
FIG. 6 is a diagram showing the arrangement of winching systems.

With reference to FIG. 6, at least one fuselage 51, 52 carries a winching system 80. Each winching system is arranged in the inter-fuselage space 60. A searchlight 85 may be carried by the wing, e.g. under the rotor mast.

Each winching system 80 is advantageously carried under the wing 10 so as to be protected from the stream of air coming from the lift rotor.

Figure 7:
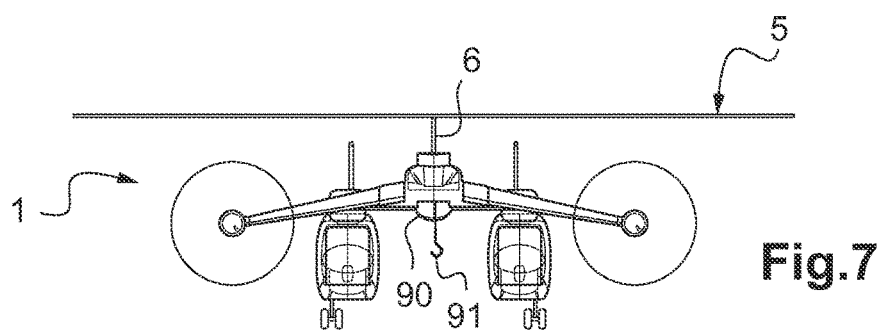
FIG. 7 is a diagram showing the arrangement of a hoist system.

With reference to FIG. 7, the rotorcraft 1 is optionally fitted with a hoist system 90 in the inter-fuselage space 60. The hoist system 90 is then fastened to the wing 10 under the rotor mast 6, for example. By way of example, the hoist system 90 includes at least one hook 91, or indeed means for moving the hook.

Furthermore, in the variant of FIG. 2, each fuselage is fitted with a buoyancy device 95, of conventional type.

In addition, at its front end, each fuselage carries a thermal camera 96, such as a device known under the acronym FLIR.

Under such circumstances, and with reference to FIG. 8, each fuselage may include a cockpit 53 for a pilot. Each pilot then has a thermal camera available.

Furthermore, each fuselage shown receives a cabin 54 containing two rows of seats 55 without an aisle. The number of seats present in each fuselage does not require a member of the crew to be present in the cabin and therefore does not require an aisle to be present. This increases the amount of space available for each passenger.

Furthermore, the fuselage may be of minimized height. All of the seats are directly accessible from the outside via side doors. There is therefore no need for a passenger to move about inside the fuselage.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A rotorcraft comprising:
   a first fuselage having a first underside;
   a first landing gear undercarriage coupled to the underside of the first fuselage;
   a second fuselage spaced from the first fuselage, the second fuselage having a second underside;
   a second landing gear undercarriage coupled to the second underside of the second fuselage;
   a wing extending from a first end to a second end, the wing having an upper surface;
   a first propulsive propeller coupled with the wing;
   a second propulsive propeller coupled with the wing; and
   a vertical lift rotor coupled with the wing, wherein the first fuselage and the second fuselage are coupled with the wing between the first propulsive propeller and the second propulsive propeller to provide an inter-fuselage space, and the lift rotor is coupled to the upper surface of the wing between the first fuselage and the second fuselage and over the inter-fuselage space, wherein no propulsive propeller is coupled with the wing between the first and second propulsive propellers.

2. The rotorcraft of claim 1, wherein the first propulsive propeller is coupled with the wing proximate the first end and the second propulsive propeller is coupled with the wing proximate the second end.

3. The rotorcraft of claim 1, further comprising a tail boom coupled with the wing between the first fuselage and the second fuselage.

4. A rotorcraft comprising:
   a first fuselage having a first front portion, a first rear portion, a first central portion, a first cockpit and a first cabin;
   a first landing gear assembly coupled with the first fuselage;
   a second fuselage having a second front portion, a second rear portion, a second central portion, a second cockpit and a second cabin;
   a second landing gear assembly coupled with the second fuselage;
   a wing extending from a first end portion to a second end portion with a central portion therebetween the wing having an underside, the first central portion of the first fuselage being coupled to the underside of the wing at the central wing portion and the second central portion of the second fuselage being coupled to the underside of the wing at the central wing portion, the second fuselage being spaced from the first fuselage to define a gap therebetween below the central wing portion, wherein no propulsive propeller is disposed within the gap;
a first propulsive propeller coupled with the first end portion of the wing;
a second propulsive propeller coupled with the second end portion of the wing; and
a vertical lift rotor coupled with the central portion of the wing and extending above the wing.

\* \* \* \* \*